(12) United States Patent
Chatterjee et al.

(10) Patent No.: US 9,824,566 B1
(45) Date of Patent: Nov. 21, 2017

(54) ALERT MANAGEMENT BASED ON ALERT RANKINGS

(71) Applicant: SAP SE, Walldorf (DE)

(72) Inventors: Seshadri Chatterjee, Kolkata (IN); Shashank Shekhar, Patna (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 15/409,530

(22) Filed: Jan. 18, 2017

(51) Int. Cl.
*G08B 23/00* (2006.01)
*G08B 19/00* (2006.01)

(52) U.S. Cl.
CPC .................................. *G08B 19/00* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,039,980 A * | 8/1991 | Aggers | ................ | H04L 12/403 340/3.9 |
| 6,734,794 B2 * | 5/2004 | Robbins | ............... | G08B 25/008 340/506 |
| 8,648,706 B2 * | 2/2014 | Ranjun | ................ | G08B 25/001 340/500 |
| 9,019,095 B2 * | 4/2015 | Sykes | ................... | F01K 13/003 340/506 |
| 2011/0316688 A1 * | 12/2011 | Ranjan | ................ | G08B 25/008 340/511 |

* cited by examiner

*Primary Examiner* — Travis Hunnings

(57) ABSTRACT

Various embodiments of systems, computer program products, and methods to provide alert management based on alert rankings are described herein. In an aspect, a plurality of alerts corresponding to a plurality of objects are received. A check is made to determine whether at least two alerts in the plurality of alerts include an identical priority. When the at least two alerts include the identical priority, the alert rankings for the at least two alerts are determined based on a runtime attribute. Further, when two or more alerts in the at least two alerts include the identical alert ranking upon determining the alert rankings based on the runtime attribute, the alert rankings of the two or more alerts are determined based on another runtime attribute. The plurality of alerts including the alert rankings are rendered to provide an order in which the plurality of alerts to be addressed.

20 Claims, 15 Drawing Sheets

| SEQUENCE | RUNTIME ATTRIBUTES | MOVE UP ↑ OR MOVE DOWN ↓ | CONSIDER FOR ALERT RANKING |
|---|---|---|---|
| 1 | CURRENT RATING | ↑ ↓ | ☑ |
| 2 | DURATION OR CURRENT RATING | ↑ ↓ | ☑ |
| 3 | NUMBER OF TIMES THE RATING CHANGED | ↑ ↓ | ☑ |
| 4 | NUMBER OF METRICS RATED RED | ↑ ↓ | ☑ |
| 5 | NUMBER OF METRICS RATED YELLOW | ↑ ↓ | ☐ |
| 6 | TOTAL LENGTH OF TIME THE ALERT WAS RATED RED | ↑ ↓ | ☐ |
| 7 | TOTAL LENGTH OF TIME THE ALERT WAS RATED YELLOW | ↑ ↓ | ☐ |
| 8 | TOTAL LENGTH OF TIME THE ALERT WAS IN OPEN STATE | ↑ ↓ | ☑ |
| 9 | CATEGORY WHICH THE ALERT BELONGED TO <br> AVAILABILITY ↑ ↓ <br> PERFORMANCE ↑ ↓ <br> CONFIGURATION ↑ ↓ <br> EXCEPTION ↑ ↓ | ↑ ↓ | ☑ |

FIG. 4

ALERT MANAGEMENT BASED ON ALERT RANKINGS

BACKGROUND

In enterprises or with hosted solution providers, landscapes of various objects such as technical systems, databases, operating systems and the like exist. To maintain such objects, alert management may be implemented. Alert management may handle alerts corresponding to different issues encountered by the objects. Based on such alerts, users, operators or concerned technicians may be notified to resolve the issues. Further, when a considerable number of alerts occur in a given time period, it may be important for the operators to analyze and resolve the alerts efficiently.

One of the challenges that the operators face when a number of alerts occur may be prioritization of the alerts. Even though the alert management may render the alerts in a list, where one could sort and group the alerts, it may be difficult for the operators to choose the alerts that they should be working on before others (e.g., an order in which the alerts should be addressed). In this regard, a basic sorting of the alerts may exist based on "priority" (e.g., as assigned at the time of defining the alert based on severity of an issue) of an alert. However, due to a large number of alerts, there may be a number of alerts with identical priority.

BRIEF DESCRIPTION OF THE DRAWINGS

The embodiments are illustrated by way of examples and not by way of limitation in the figures of the accompanying drawings in which like references indicate similar elements. The embodiments may be best understood from the following detailed description taken in conjunction with the accompanying drawings.

FIG. 4 illustrates an example sequence of runtime attributes, according to an embodiment.

DETAILED DESCRIPTION

Embodiments of techniques to provide alert management based on alert rankings are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instance, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

In this document, various methods, processes and procedures are detailed. Although particular steps may be described in a certain sequence, such sequence may be mainly for convenience and clarity. A particular step may be repeated more than once, may occur before or after other steps (even if those steps are otherwise described in another sequence), and may occur in parallel with other steps. Further, a step may be executed upon executing another step. Such a situation may be specifically pointed out when not clear from the context. A particular step may be omitted. Further, it is to be understood that the various actions (retrieving, determining, generating, rendering, and so on) may be performed by a hardware device (e.g., computing system), even if the action may be authorized, initiated or triggered by a user, or even if the hardware device is controlled by a computer program, software, firmware, and the like.

Figure 1:
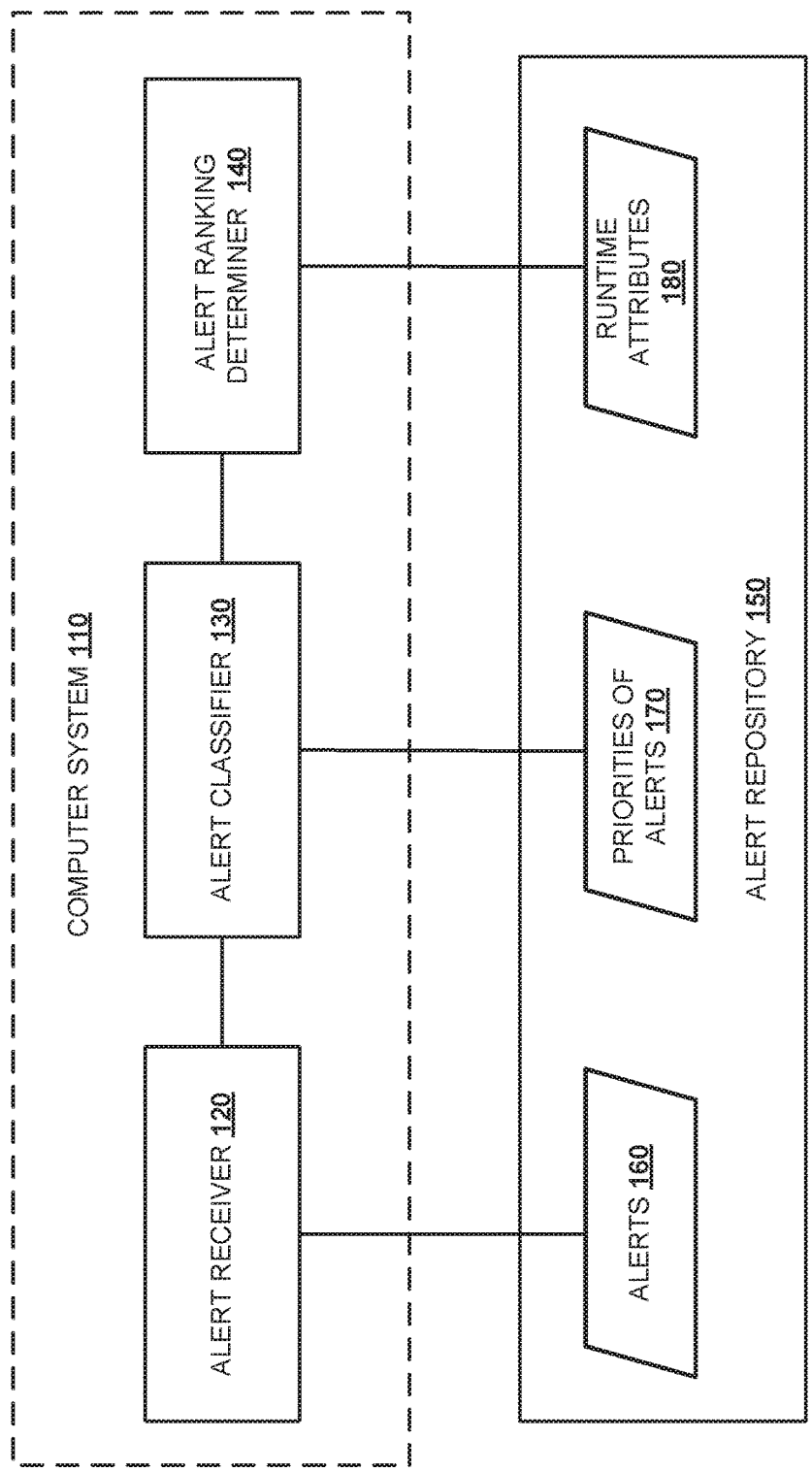
FIG. 1 is a block diagram of a computing environment illustrating alert management based on alert rankings, according to one embodiment.

FIG. 1 is a block diagram of a computing environment illustrating alert management based on alert rankings, according to one embodiment. In a landscape of various objects such as, but not limited to technical systems, databases and operating systems, an alert management system may facilitate in maintaining the objects. For example, the alert management system may provide alerts corresponding to the objects. An alert may be referred to as an indication of an issue encountered by an object. Further, through the alert management systems, the alerts may be notified to users, operators, or concerned technicians to resolve the issues. In one embodiment, when there are a number of alerts at a given point in time, an order in which the alerts are to be addressed may be determined by providing alert rankings to the alerts.

In one embodiment, computer system 110 may include alert receiver 120, alert classifier 130, and alert ranking determiner 140 to determine the order in which the alerts to be addressed. Further, the alerts (e.g., 160) for which the alert rankings are determined based on priorities (e.g., 170) and runtime attributes (e.g., 180) associated with the alerts may be stored in alert repository 150. The computer system 110 may include one or more processors and a memory. For example, the computer system 110 may be a server, a workstation, a mobile device, an embedded system or other device having at least one processor and the memory. Further, the computer system 110 may include a communication port or input/output device for communicating over wired or wireless communications.

The alert receiver 120 may receive alerts 160 from the alert repository 150 and/or from the objects, for example. The alert classifier 130 sorts the alerts 160 based on priorities 170 associated with the alerts 160. An attribute "priority" of an alert may be specified when defining the alert to indicate "severity" of an issue. Therefore, the "priority" of the alert may be defined by a function of attributes "severity" and "current rating", for example. The attribute "severity" may indicate a degree of damage, or the negative impact of the alert. For example, the attribute "severity" may be scaled from "0" to "9", where "0" denotes least severe and "9" denotes most severe. The attribute "current rating" of the alert may assume, at any point in time, one of the four possible values, e.g., red (e.g., indicating "critical"), yellow (e.g., indicating "warning"), green (e.g., indicating "all okay") and grey (e.g., indicating "status not known" at the given point in time). In other words, the "severity" may indicate the degree of damage and the "current rating" states if the damage has occurred. Therefore, the alerts may include one of the four possible priorities, e.g., "low", "medium", "high" and "very high." Further, based on the attribute "priority", there may be two or more alerts with same "priority."

In one embodiment, a check is made to determine whether at least two alerts include an identical "priority." When the at least two alerts include the identical priority, the alert rankings are determined for the at least two alerts by the alert ranking determiner 140. The alert rankings may be determined based on the runtime attributes 180. The runtime attributes 180 may include, but not limited to, runtime state and contributing metrics of the alerts. The runtime state may define status (e.g., "open" or "closed") of the alert at a given point in time. Further, contributing metrics may include one or more factors influencing the alert. For example, the runtime attributes may include, but not limited to the "current rating", "duration of the current rating", a "number of times rating associated with the alert has changed", a "number of metrics associated with the alert are rated red", a "number of metrics associated with the alert are rated yellow", a "total length of time the alert was rated red", a "total length of time the alert was rated yellow", a "total length of time the alert was in open state", and a "category" associated with the alert, which are described in greater detail in FIG. 2.

In one embodiment, the alert rankings for the alerts having identical priority are determined by a runtime attribute (e.g., the "current rating" associated with the alert). The "current rating" associated with the alert may change from time to time (e.g., from the time the alert was defined to "now") as the objects may recover from the issue automatically or severity of the issue may be changed by time. Thereby, the "current rating" at the time of defining the alert may not be same as the "current rating" "now." Further, even upon determining the alert rankings based on the runtime attribute, if the at least two alerts includes an identical ranking, another runtime attribute (e.g., "duration of the current rating") may be considered for determining the alert rankings. The alert rankings may be determined based on another runtime attribute considering existence of another runtime attribute.

In one embodiment, the runtime attributes may be considered in a sequence for determining the alert rankings, which may be configured/modified. Thereby, the alert rankings for the alerts may be determined until the alerts include different alert rankings or until there are no additional runtime attributes for determining the alert rankings. Therefore, when alerts end up with identical "priority", other runtime attributes (e.g., runtime state and contributing metrics of the alerts) may be considered to rank the alerts. Thereby the operators may be facilitated to address the alerts in the order of importance or criticality of the alerts.

Figure 2:
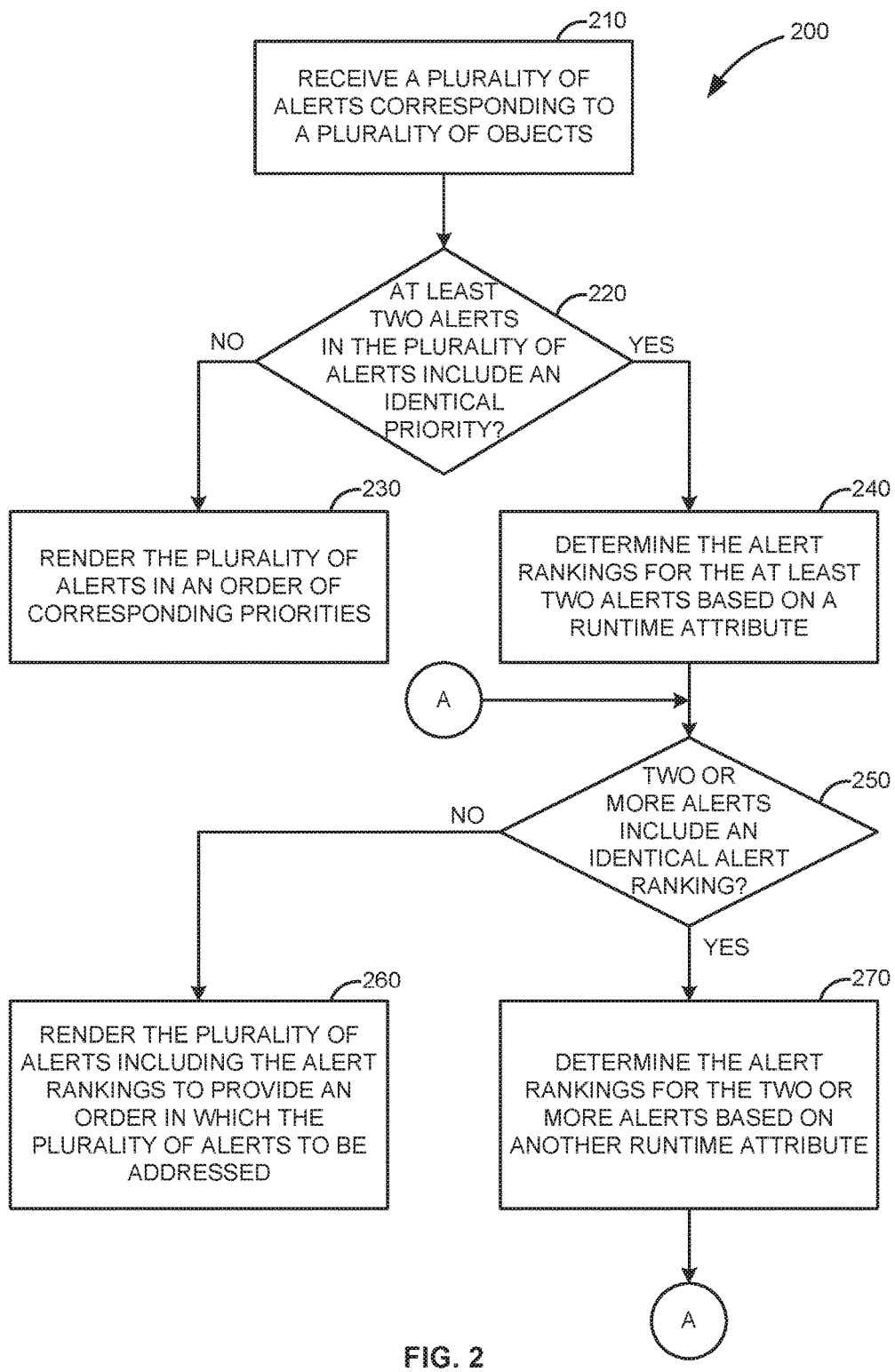
FIG. 2 is a flow diagram illustrating an example process to provide alert management based on alert rankings, according to an embodiment.

FIG. 2 is a flow diagram illustrating example process 200 to provide alert management based on alert rankings, according to an embodiment. At 210, alerts corresponding to different objects are received. The objects can be, but not limited to technical systems, databases, and operating systems. At 220, a check is made to determine whether at least two alerts include an identical priority. Determining whether the at least two alerts include the identical priority may include retrieving priorities associated with the alerts, sorting the alerts based on the associated priorities, and determining whether the at least two alerts in the sorted alerts include the identical priority. For example, the alerts may be one of the four possible values based on the corresponding priorities, e.g., "low", "medium", "high" and "very high." Further, there may be more than two alerts having "high" priority, for example, and such identical priority alerts are identified. At 230, when there are no alerts with identical priority, the alerts are sorted in an order based on priorities associated with the alerts.

At 240, when the at least two alerts include the identical priority, the alert rankings are determined for the at least two alerts based on a runtime attribute. The runtime attribute may assist in determining the sense of urgency in which an alert needs to be addressed. At 250, a check is made to determine whether two or more alerts in the at least two alerts include the identical alert ranking upon determining the alert rankings based on the runtime attribute. At 260, when the two or more alerts include different alert rankings, the alerts including the alert rankings are rendered to provide an order in which the alerts to be addressed.

Figure 3:
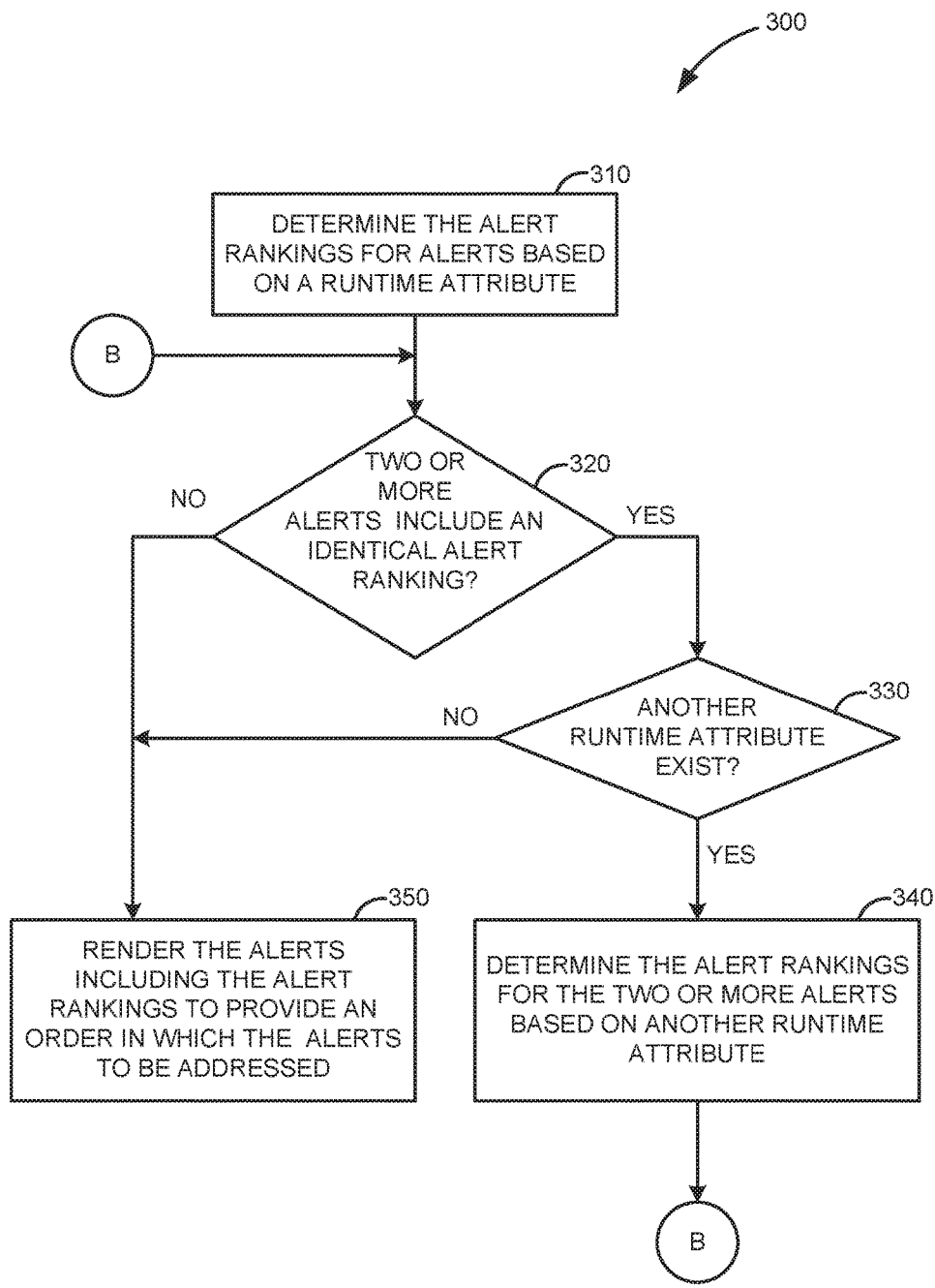
FIG. 3 is a flow diagram illustrating an example process to determine alert rankings for alerts, according to an embodiment.

At 270, when the two or more alerts include the identical alert ranking upon determining the alert rankings based on the runtime attribute, the alert rankings of the two or more alerts are determined based on another runtime attribute (e.g., considering existence of another runtime attribute), which is described in greater detail in FIG. 3. In one embodiment, the runtime attributes may be considered in a sequence for determining the alert rankings, which may be configured/modified. Thereby, the alert rankings may be determined until the alerts include different alert rankings or until there are no runtime attributes.

In one embodiment, the runtime attributes may include a "current rating", "duration of the current rating", a "number of times rating associated with the alert has changed", a "number of metrics associated with the alert are rated red", a "number of metrics associated with the alert are rated yellow", a "total length of time the alert was rated red", a "total length of time the alert was rated yellow", a "total length of time the alert was in open state", and a "category" associated with the alert.

The runtime attribute "current rating" may be a rating that prevails "now." Further, the "current rating" may be prevailing over a period of time and the length of time may be defined by the runtime attribute "duration of current rating." Also, the rating of the alert may change from time to time based on status of objects. A number of times the ratings was changed since the time the alert was triggered until "now" may be defined by the runtime attribute "number of times rating associated with the alert has changed."

In one embodiment, one or more different metrics may contribute to the alert at any point in time. For example, consider the alert "not enough space in a database." The contributing metrics may be "request queue usage", "thread usage", "requests in queue" and the like. Also, it may not be necessary that all the metrics contributing to the alert would have same rating. A number of metrics contributing to the alert may be rated "red", while other contributing metrics may be rated "yellow", or some of the contributing metrics may be even "green" or "gray." Accordingly, runtime attributes "number of metrics associated with the alert are rated red", "number of metrics associated with the alert are rated yellow". "total length of time the alert was rated red" and "total length of time the alert was rated yellow" are considered for determining the alert rankings.

In one embodiment, some alerts may be in open state for longer time compared to other alerts. Thereby, a runtime attribute "total length of time the alert was in open state" may be considered for determining the alert rankings. Further, the alert may belong to one of the predefined categories such as, but not limited to "availability", "performance", "exception" and "configuration." For example, when the alert belongs to "availability" category, it may be considered critical as the availability of an object is affected than other situations like performance issues or exception issues or configuration issues. Different categories may be defined by the runtime attribute "category."

In one embodiment, when two or more alerts are associated with identical "priority", a first runtime attribute (e.g., "current rating") in the sequence would be considered for determining the alert rankings, followed by a second runtime attribute (e.g., "duration of the current rating"), followed by a third runtime attribute (e.g., "number of times the rating changed"), and so on until the two or more alerts include different alert rankings or until there are no other runtime attributes. For example, the alert with "current rating" "red" would be ranked higher. Among the alerts still ranked same after considering the runtime attribute "current rating", the alert with longer duration of the current rating would be ranked higher. In one embodiment, durations within a predefined time (e.g., 10 minutes) may be considered as same to allow sporadic changes, if any. After considering the two runtime attributes (e.g., "current rating" and "duration of current rating"), if two or more alerts are still ranked equal, the next runtime attribute (e.g., "number of times the rating changed") may be considered, and the alerts with less changes in rating would be ranked higher, and so on.

FIG. 3 is a flow diagram illustrating an example process to determine alert rankings for alerts, according to an embodiment. When the alerts include an identical priority, the alert rankings are determined for the alerts based on runtime attributes. At 310, the alert rankings for the alerts are determined by a runtime attribute. At 320, a check is made to determine whether two or more alerts includes an identical alert ranking upon determining the alert rankings based on the runtime attribute.

At 330, when the two or more alerts include the identical alert ranking, a check is made to determine whether there exist another runtime attribute. At 340, upon determining the existence of another runtime attribute, the alert rankings for the two or more alerts are determined based on another runtime attribute. Therefore, the alert rankings are determined until the alerts include different alert ranking or until there are no other runtime attribute. At 350, when there are no identical rankings or when there are no other runtime attributes, the alerts including the alert rankings are rendered to provide an order in which the alerts to be addressed.

FIG. 4 illustrates an example sequence of runtime attributes, according to an embodiment. First column 410 depicts the example sequence (e.g., 1 to 9) of runtime attributes and second column 420 depicts the runtime attributes associated with the sequence. For example, a runtime attribute "current rating" is weighted high compared to a runtime attribute "duration of current ratting" as the runtime attribute "current rating" is at sequence "one" and the runtime attribute "duration of current rating" is at sequence "two." Similarly, other seven runtime attributes (e.g., a "number of times rating associated with the alert has changed", a "number of metrics associated with the alert are rated red", a "number of metrics associated with the alert are rated yellow", a "total length of time the alert was rated red", a "total length of time the alert was rated yellow", a "total length of time the alert was in open state" and a "category") are arranged in the sequence.

In one embodiment, the sequence of the runtime attributes may be modified or configured as shown in third column 430. For example, by adjusting the arrows in the third column, the runtime attributes may be assigned relative weightages for determining the alert rankings. The runtime attribute "total length of time an alert was in open state", for example, could be modified to have higher weightage than the weightage of "duration of current rating." Further, the runtime attributes may be selected for determining alert rankings as shown in fourth column 440 by skipping certain runtime attributes from consideration of the alert rankings. For example, by checking or unchecking the boxes associated with the corresponding runtime attributes, the runtime attributes can be selected or unselected for determining the alert rankings.

Figure 5:
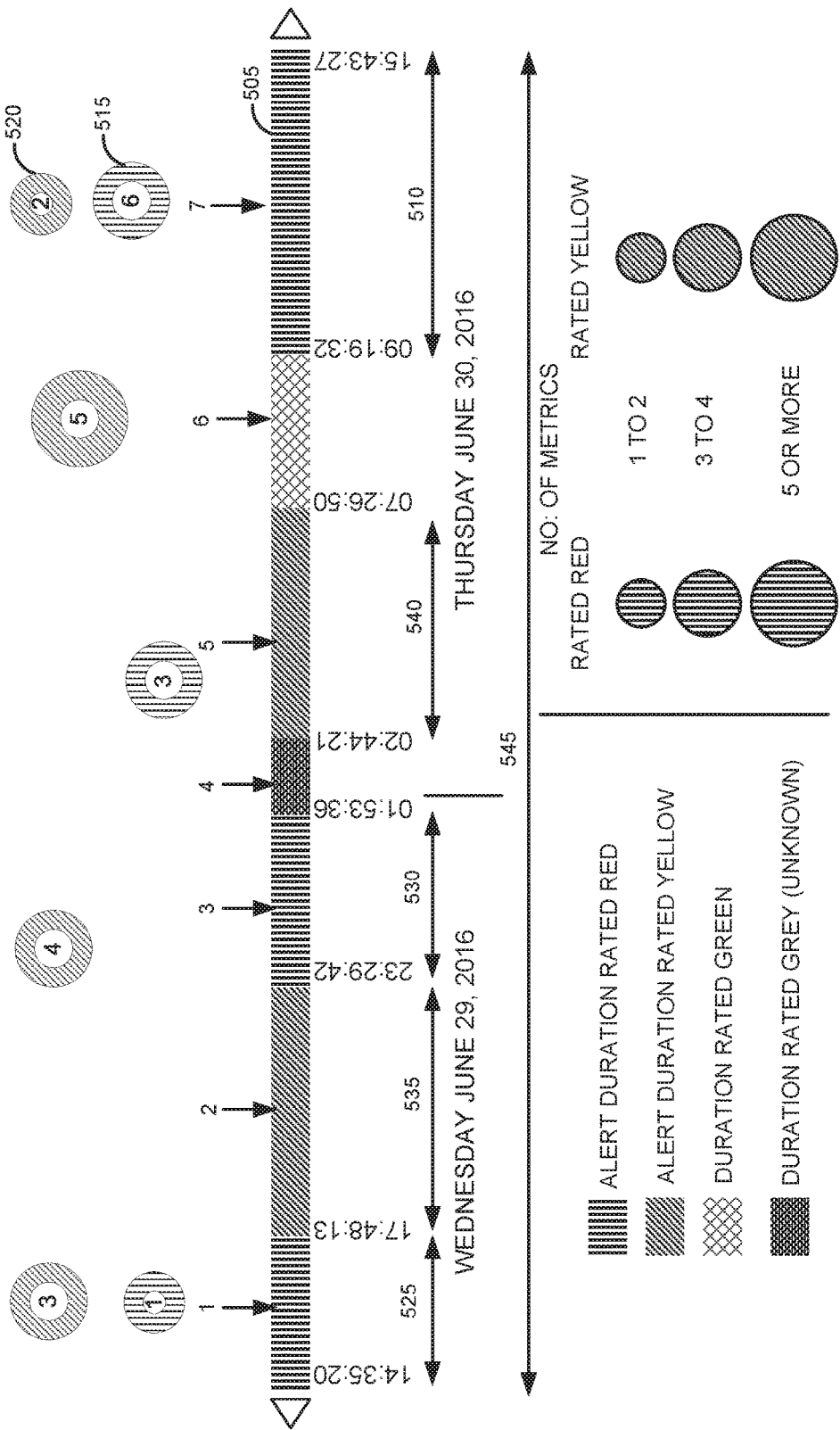
FIG. 5 illustrates an example alert with corresponding runtime attributes, according to an embodiment.

FIG. 5 illustrates an example alert with corresponding runtime attributes, according to an embodiment. In the example alert, a runtime attribute "current rating" associated with the alert is "red" indicating the alert is critical (e.g., 505). A runtime attribute "duration of the current rating" is approximately 6 hours and 24 minutes (e.g., from 09:19:32 to 15:43:27, Thursday Jun. 30, 2016, e.g., 510). A runtime attribute "number of times rating associated with the alert has changed" is seven. A runtime attribute "number of metrics associated with the alert are rated red" is six (e.g., 515). A runtime attribute "number of metrics associated with the alert are rated yellow" is two (e.g., 520). A runtime attribute "total length of time the alert was rated red" is approximately 12 hours (e.g., from 14:35:20 to 17:48:13 Wednesday, Jun. 29, 2016, e.g., 525, then from 23:29:42 Wednesday, Jun. 29, 2016 to 01:53:36 Thursday, Jun. 30, 2016, e.g., 530; then from 09:19:32 to 15:43:27, Thursday, Jun. 30, 2016, e.g., 510). A runtime attribute "total length of time the alert was rated yellow" is approximately 10 hours and 14 minutes (e.g., 535 and 540). A runtime attribute "total length of time the alert was in open state" is approximately 1 day 1 hour 8 min (e.g., 545). In one embodiment, measures of the runtime attributes are recorded and stored in an alert repository.

Figure 6A:
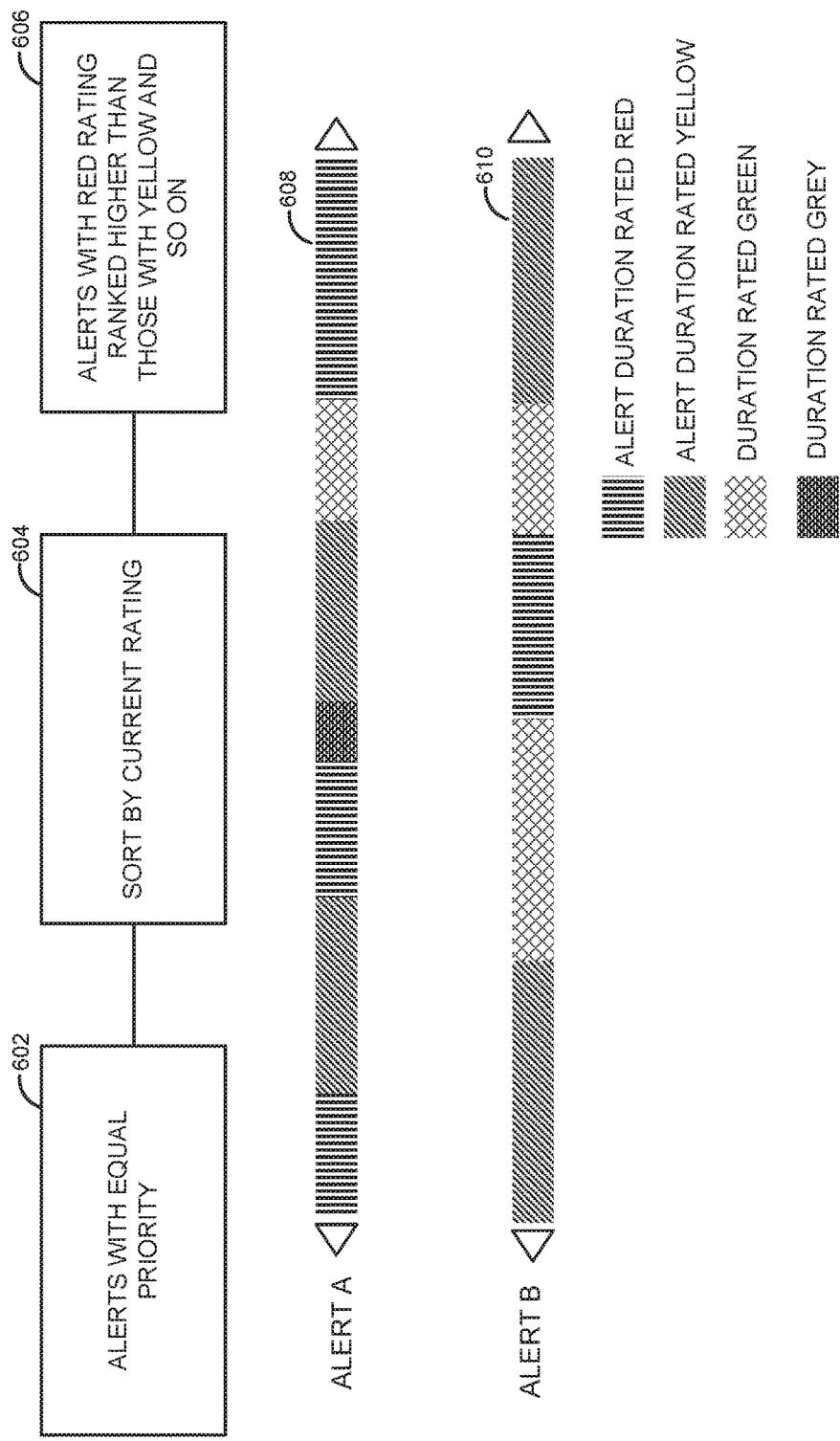
FIG. 6A is a sequence diagram illustrating determining alert rankings based on a runtime attribute "current ratings", according to an embodiment.

FIG. 6A is a sequence diagram illustrating determining alert rankings based on a runtime attribute "current ratings", according to an embodiment. Rating that prevails "now" may be defined as "current rating". For example, the "current rating" may be rated as one of "red" (e.g., indicating critical), yellow (e.g., indicating "warning",), green (e.g., indicating "all okay"), and grey (e.g., indicating "status not known" at the given point in time). At 602, when two or more alerts end up assuming equal "priority", the two or more alerts may be sorted based on corresponding "current ratings" (e.g., at 604). At 606, based on the runtime attribute "current ranking", alerts rated "red" (e.g., indicating critical) may be ranked higher than those with "yellow" (e.g., indicating warning) and so on. In the example, there are two alerts "alert A" and "alert B". Among the two example alerts, "alert A" would be ranked higher than "alert B" as the "current rating" of "alert A" is "red" (e.g., 608) whereas the "current rating" of "alert B" is "yellow" (e.g., 610).

Figure 6B:
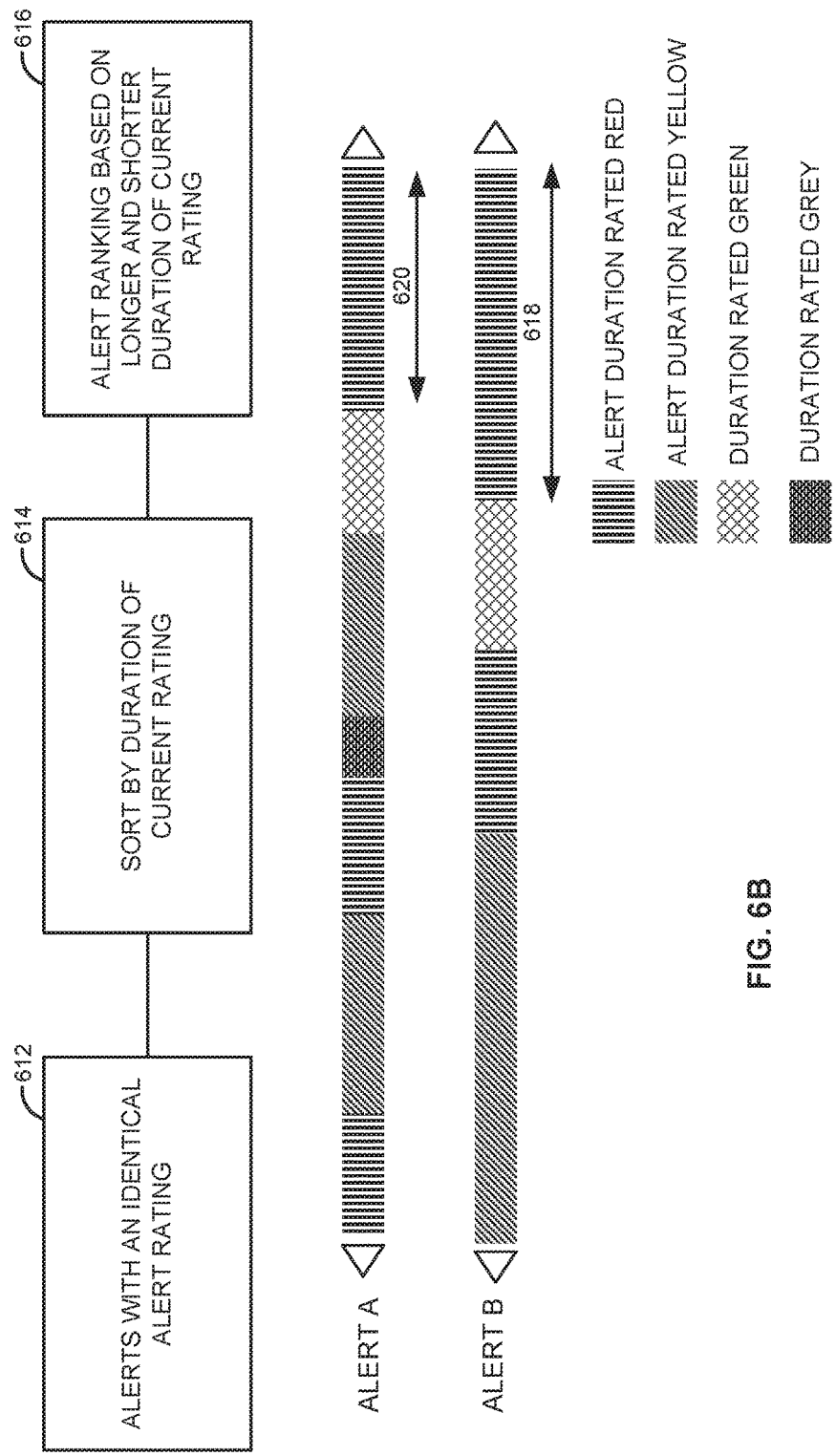
FIG. 6B is a sequence diagram illustrating determining alert rankings based on a runtime attribute "duration of current ratings", according to an embodiment.

FIG. 6B is a sequence diagram illustrating determining alert rankings based on a runtime attribute "duration of current ratings", according to an embodiment. Upon ranking the alerts based on a runtime attribute "current rating", there may be alerts with identical alert rankings. In such a situation, a next runtime attribute (e.g., "duration of current ratings") in the sequence is considered for determining the alert rankings. The "current rating" may be prevailing over a period of time. The length of time may be defined as "duration of current rating". At 612, when two or more alerts end up assuming identical alert ranking upon considering runtime attributes "priority" and "current rating", the two or more alerts may be sorted based on corresponding "duration of current ratings" (e.g., at 614). At 616, based on the runtime attribute "duration of current ranking", alerts with longer duration of current rating may be ranked higher than those with shorter duration of current rating. In the example, there are two alerts "alert A" and "alert B". Among the two example alerts, "alert B" would be ranked higher than "alert A" as the "duration of current rating" of "alert B" (e.g., 618) is longer compared to the "duration of current rating" of "alert A" (e.g., 620).

Figure 6C:
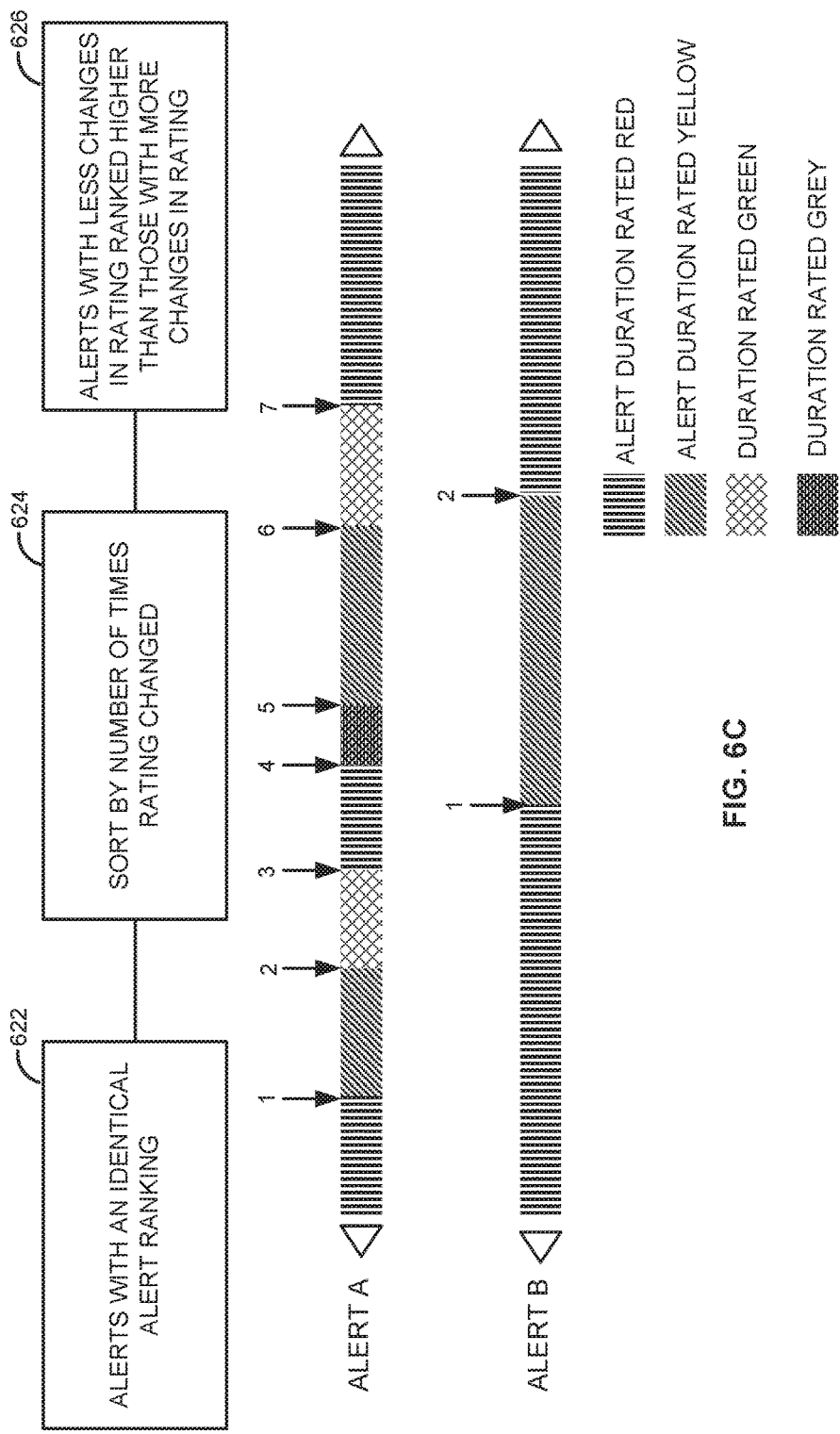
FIG. 6C is a sequence diagram illustrating determining alert rankings based on a runtime attribute "number of times rating changed while alert was in open state", according to an embodiment.

FIG. 6C is a sequence diagram illustrating determining alert rankings based on a runtime attribute "a number of times rating changed while alert was in open state", according to an embodiment. The rating of an alert may change from time to time (e.g., due to auto correction by objects or severity of an issue). The number of times the rating was changed since the time the alert was triggered until "now" may be recorded. For example, more the number of changes, greater can be the indication that the "situation" that led to the alert is not stable, or the alert may be caused by temporary flickering of object parameters. On the other hand, a less number of changes in the rating or no change in the rating since the alert was triggered may indicate that the cause of the alert is prevailing in a rather steady fashion. Therefore, the alerts with a steady pattern in their rating-changes may deserve more attention than those with sporadic pattern in their rating-changes.

At 622, when two or more alerts end up assuming identical alert ranking upon considering runtime attributes "priority", "current rating" and "duration of current rating", the two or more alerts may be sorted based on corresponding "number of times rating changed" (e.g., at 624). At 626, based on the runtime attribute "number of times rating changed", alerts with less number of changes in ratings may be ranked higher compared to alerts with more number of changes in ratings. In the example, there are two alerts "alert A" and "alert B". Among the two example alerts, "alert B" would be ranked higher than "alert A" as "alert B" includes less number of changes (e.g., "two") as compared to "alert A" (e.g., "seven").

Figure 6D:
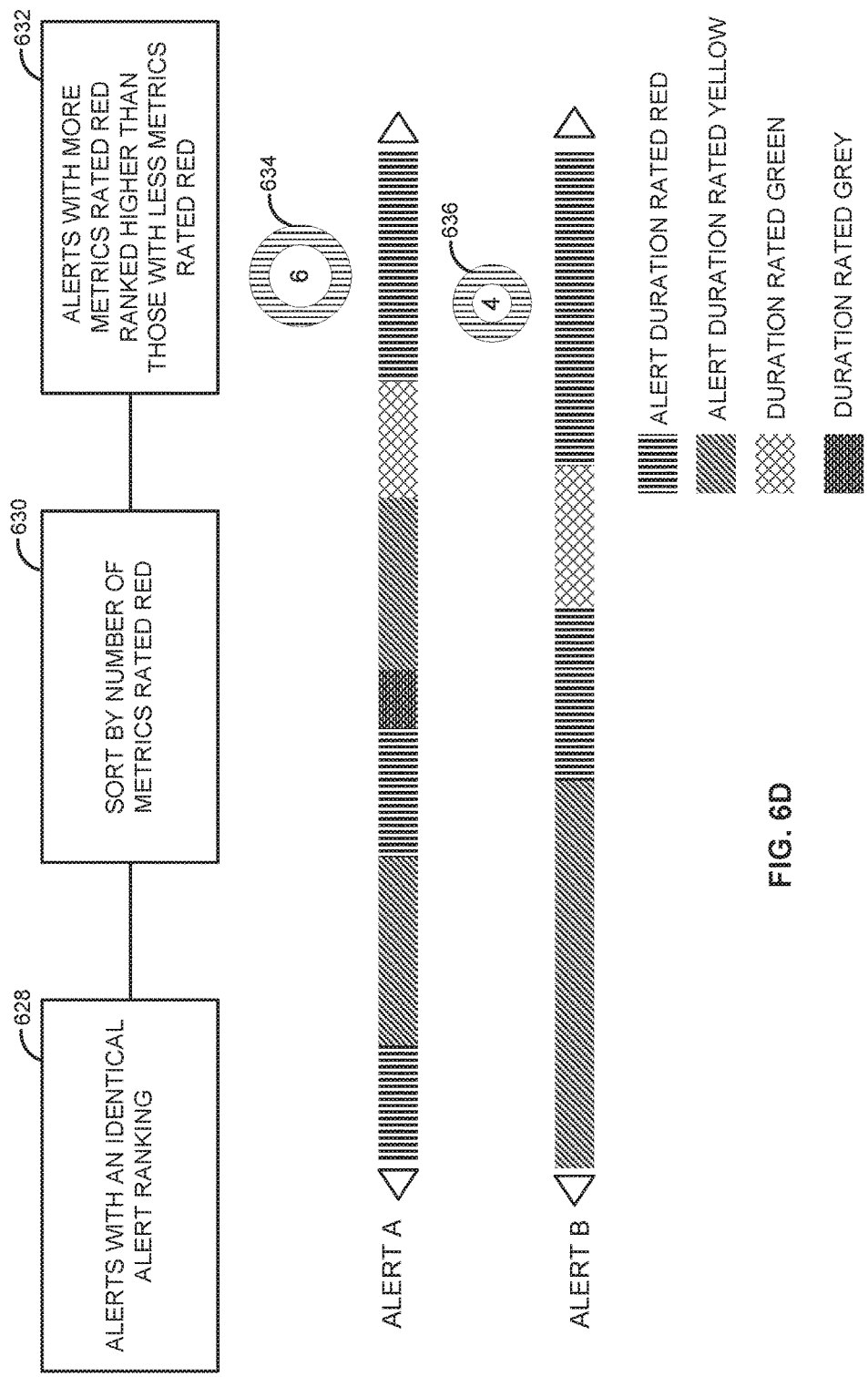
FIG. 6D is a sequence diagram illustrating determining alert rankings based on a runtime attribute "number of metrics rated red", according to an embodiment.

FIG. 6D is a sequence diagram illustrating determining alert rankings based on a runtime attribute "a number of metrics rated red", according to an embodiment. One or more different metrics may contribute to an alert at any point in time. At runtime, when the values and ratings of the metrics are collected, the metric contributing to the alert may not have same rating. A number of metrics contributing to the alert may be rated red, while some other contributing metrics may be rated yellow, or some of the metrics could even be green or grey.

At 628, when two or more alerts end up assuming identical alert ranking upon considering runtime attributes "priority", "current rating", "duration of current rating" and "number of times rating changed", the two or more alerts may be sorted based on corresponding "number of metrics rating red" (e.g., at 630). At 632, based on the runtime attribute "number of metrics rating red", an alert with more number of metrics rated red "now" would be ranked higher compared to another alert with lesser number of contributing metrics rated red. In the example, there are two alerts "alert A" and "alert B". Among the two example alerts, "alert A" would be ranked higher than the "alert B" as "alert A" includes six number of metrics rated red at the moment (e.g., 634), compared to four metrics rated red in "alert B" (636).

Figure 6E:
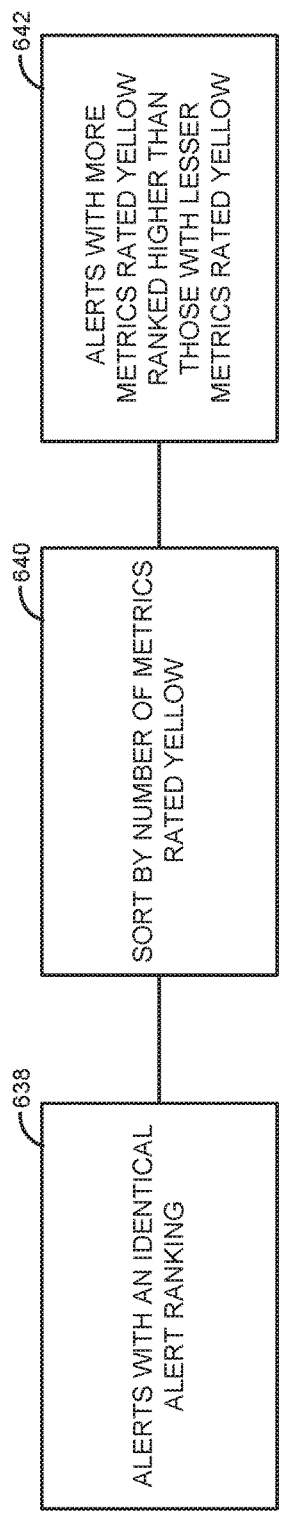
FIG. 6E is a sequence diagram illustrating determining alert rankings based on a runtime attribute "number of metrics rated yellow", according to an embodiment.

FIG. 6E is a sequence diagram illustrating determining alert rankings based on a runtime attribute "a number of metrics rated yellow", according to an embodiment. Similar to the consideration of a runtime attribute "number of metrics rated red", the runtime attribute "number of metrics rated yellow" may be considered. At 638, when two or more alerts end up assuming identical alert ranking upon considering runtime attributes "priority", "current rating", "duration of current rating", "number of times rating changed" and "number of metrics rated red", the two or more alerts may be sorted based on corresponding "number of metrics rating yellow" (e.g., at 640). At 642, based on the runtime attribute "number of metrics rating yellow", an alert with more number of metrics rated yellow "now" would be ranked higher compared to another alert with lesser number of contributing metrics rated yellow.

Figure 6F:
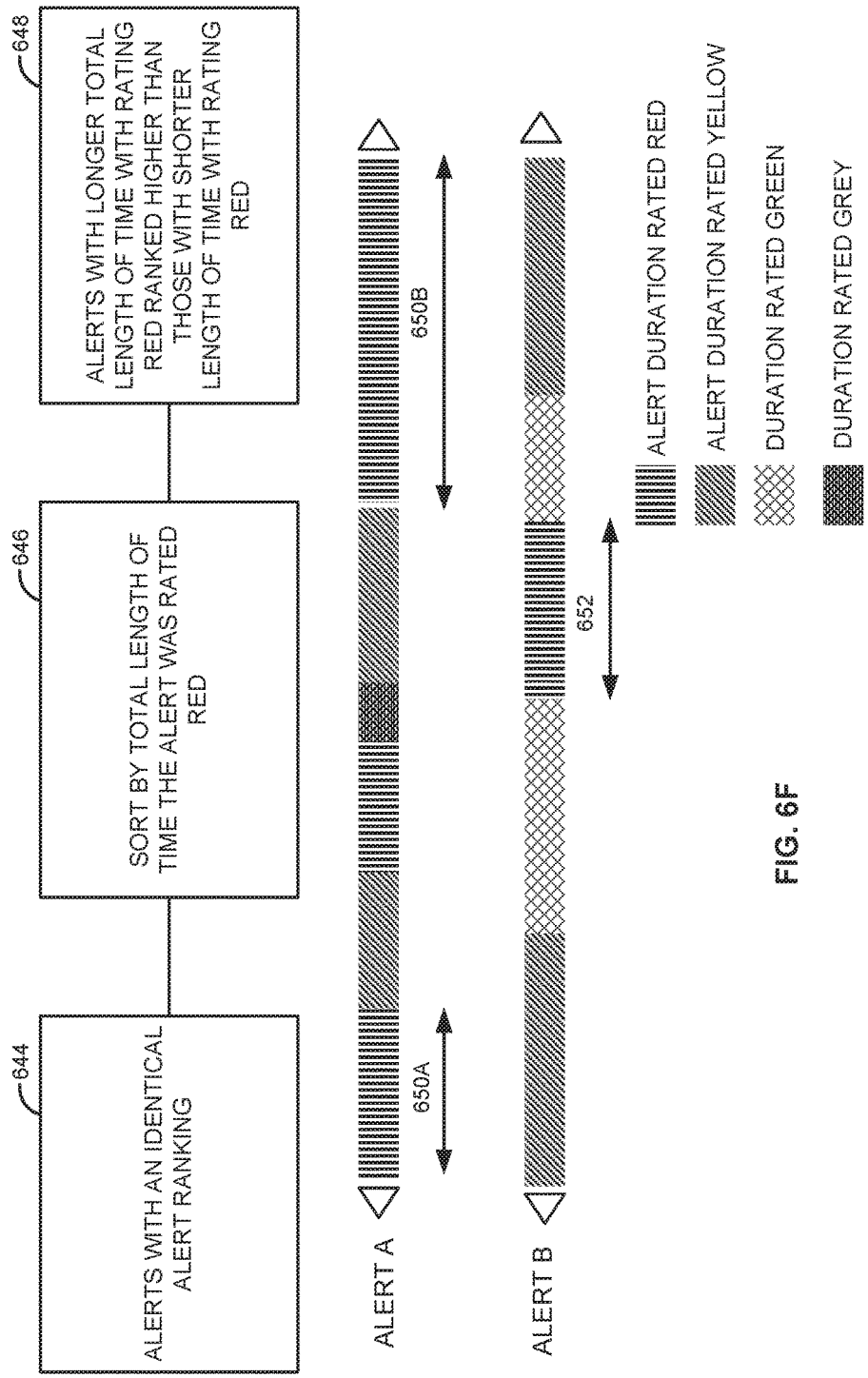
FIG. 6F is a sequence diagram illustrating determining alert rankings based on a runtime attribute "total length of time an alert was rated red", according to an embodiment.

FIG. 6F is a sequence diagram illustrating determining alert rankings based on a runtime attribute "total length of time an alert was rated red", according to an embodiment. Rating of an alert may keep changing over a period of time the alert was in open state. For example, consider the alert is in open state for around 12 hours. Even though it is not necessary that the alert was rated "red" throughout this 12 hours, the time-windows when it was rated "red" may be critical. Thereby "total length of time an alert was rated red" manifests the total duration the alert depicted the "worst" situation, while it may have undergone some betterment on-and-off.

At 644, when two or more alerts end up assuming identical alert ranking upon considering runtime attributes "priority", "current rating". "duration of current rating", "number of times rating changed", "number of metrics rated red" and "number of metrics rated yellow", the two or more alerts may be sorted based on corresponding "total length of time an alert was rated red" (e.g., at 646). At 648, based on the runtime attribute "total length of time an alert was rated red", an alert with longer total length of time with rating red ranked higher than another alert with shorter length of time with rating red. In the example, there are two alerts "alert A" and "alert B". Among the two example alerts, "alert A" would be ranked higher than the "alert B" as "alert A" includes longer length of time with rating red (e.g., 650A and 650B) compared to length of time with rating red (e.g., 652) corresponding to the alert "B."

Figure 6G:
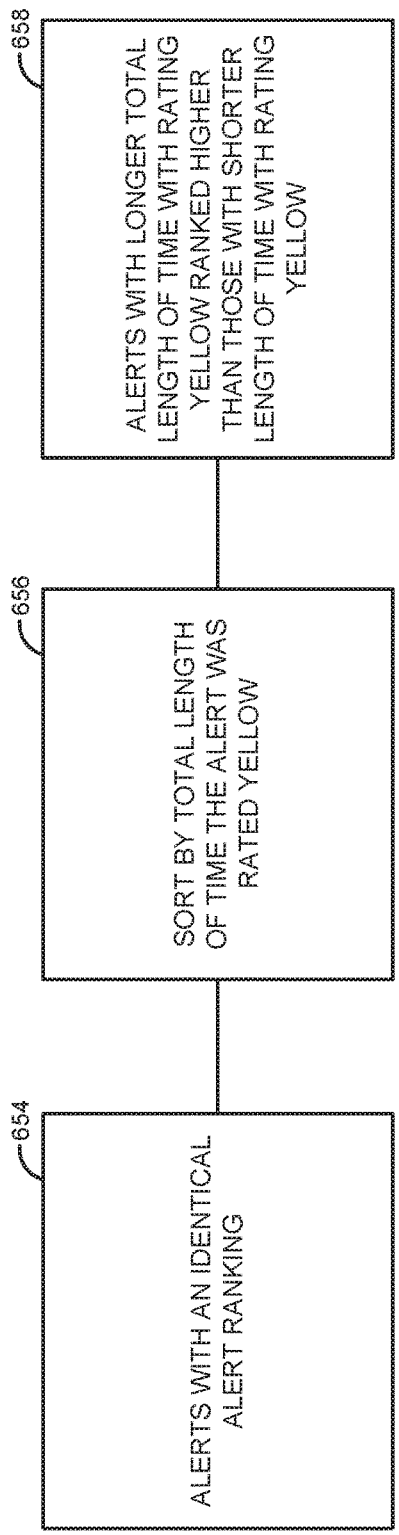
FIG. 6G is a sequence diagram illustrating determining alert rankings based on a runtime attribute "total length of time an alert was rated yellow", according to an embodiment.

FIG. 6G is a sequence diagram illustrating determining alert rankings based on a runtime attribute "total length of time an alert was rated yellow", according to an embodiment. Similar to the consideration of a runtime attribute "total length of time the alert was rated red", next run time attribute that would be considered is the "total length of time the alert was rated yellow." At 654, when two or more alerts end up assuming identical alert ranking upon considering runtime attributes "priority", "current rating", "duration of current rating", "number of times rating changed", "number of metrics rated red", "number of metrics rated yellow" and "total length of time the alert was rated red", the two or more alerts may be sorted based on corresponding "total length of time the alert was rated yellow" (e.g., at 656). At 658, based on the runtime attribute "total length of time an alert was rated yellow", an alert with longer total length of time with rating yellow ranked higher than another alert with shorter length of time with rating yellow.

Figure 6H:
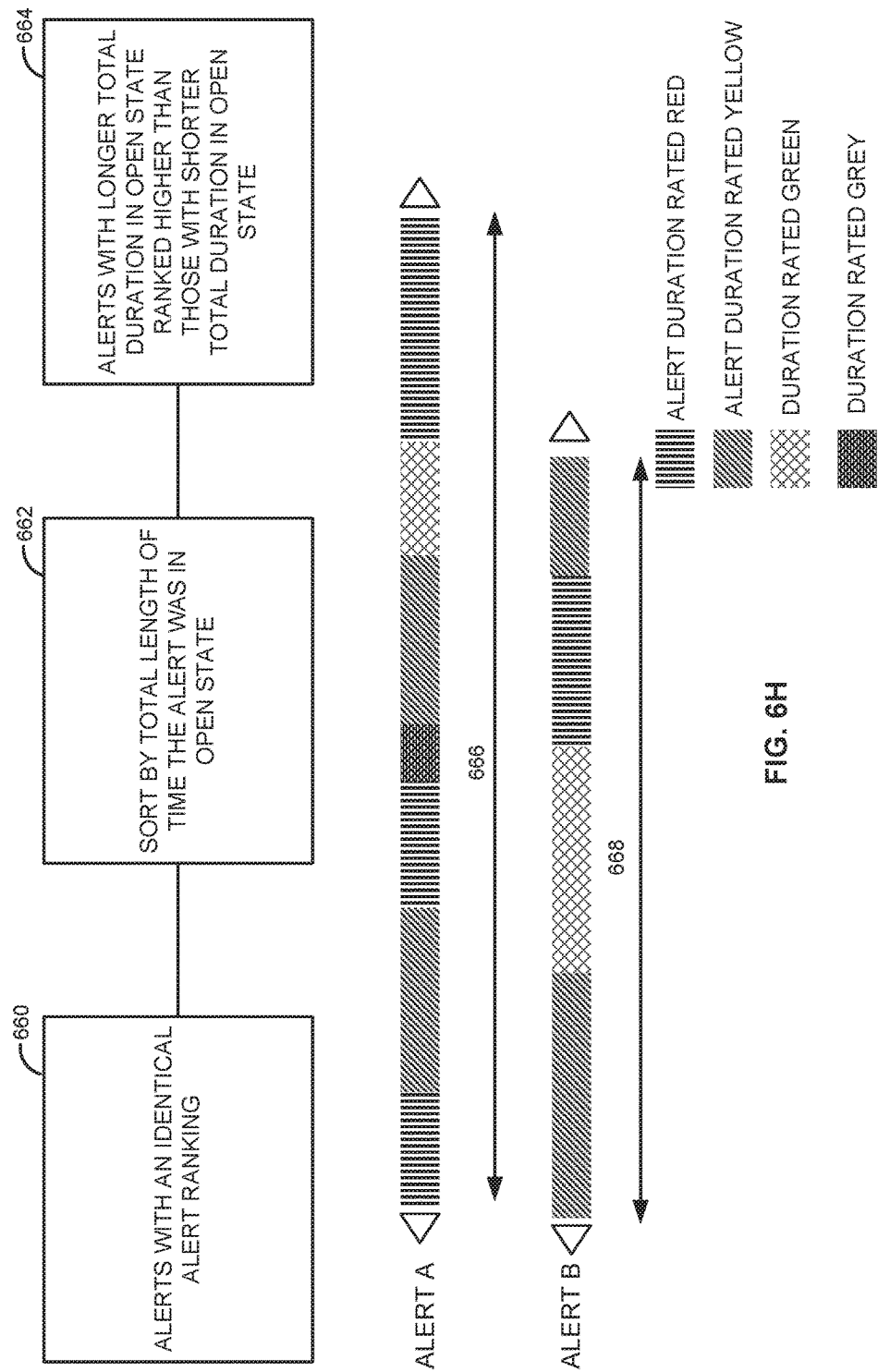
FIG. 6H is a sequence diagram illustrating determining alert rankings based on a runtime attribute "total length of time an alert was in open state", according to an embodiment.

FIG. 6H is a sequence diagram illustrating determining alert rankings based on a runtime attribute "total length of time an alert was in open state", according to an embodiment. At 660, when two or more alerts end up assuming identical alert ranking upon considering runtime attributes "priority", "current rating", "duration of current rating", "number of times rating changed", "number of metrics rated red", "number of metrics rated yellow", "total length of time the alert was rated red" and "total length of time the alert was rated yellow", the two or more alerts may be sorted based on corresponding "total length of time an alert was in open state" (e.g., at 662). At 664, based on the runtime attribute "total length of time the alert was in open state", the alert with longer length of time in open state is ranked higher compared to another alert with shorter length of time with open state. In the example, there are two alerts "alert A" and "alert B". Among the two example alerts, "alert A" would be ranked higher than the "alert B" as "alert A" was in open state for a longer time (e.g., 666) compared to "alert B) (e.g., 668).

Figure 6I:
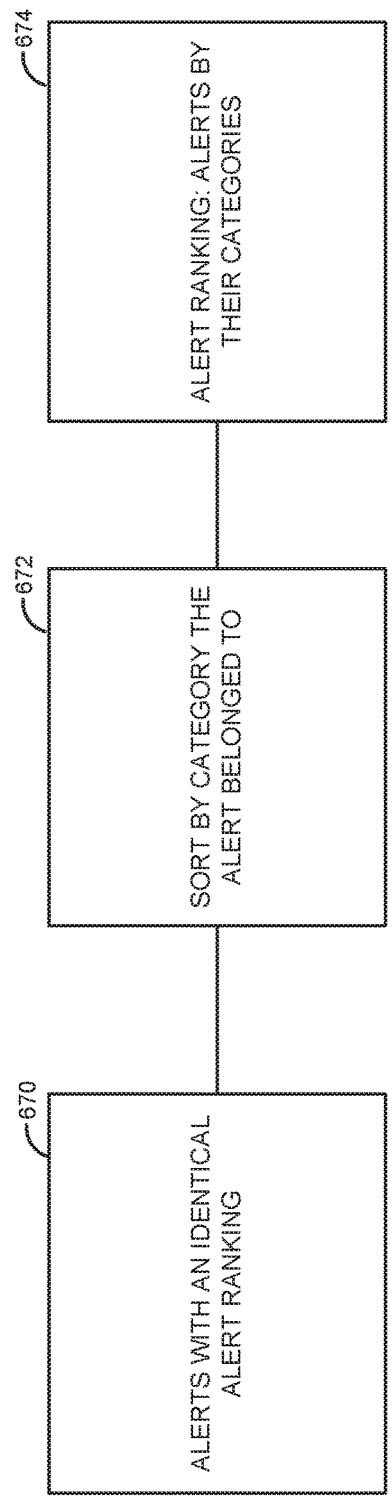
FIG. 6I is a sequence diagram illustrating determining alert rankings based on a runtime attribute "category of an alert", according to an embodiment.

FIG. 6I is a sequence diagram illustrating determining alert rankings based on a runtime attribute "category of an alert", according to an embodiment. An Alert may belong to one of the four predefined "categories", such as, "availability", "performance", "exception" and "configuration". The relative weightage of these categories among themselves may be considered. At 670, when two or more alerts end up assuming identical alert ranking upon considering runtime attributes "priority", "current rating", "duration of current rating", "number of times rating changed", "number of metrics rated red", "number of metrics rated yellow", "total length of time the alert was rated red", "total length of time the alert was rated yellow", and "total length of time an alert was in open state", the two or more alerts may be sorted based on corresponding "category of an alert" (e.g., at 672). At 674, based on the runtime attribute "category of the alert", the alerts are ranked. Thereby, the alerts may be associated with different alert rankings based on the runtime attributes.

Some embodiments may include the above-described methods being written as one or more software components. These components, and the functionality associated with them, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" includes a single medium or multiple media that stores one or more sets of instructions. The term "computer readable storage medium" includes physical article that is capable of undergoing a set of physical changes to physically store, encode, or otherwise carry a set of instructions for execution by a computer system which causes the computer system to perform the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape, optical media such as CD-ROMs, DVDs and holographic indicator devices; magneto-optical media, and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java. C++, or other object-oriented programming language and development tools. Another embodiment may be implemented in hard-wired circuitry in place of, or in combination with machine readable software instructions.

Figure 7:
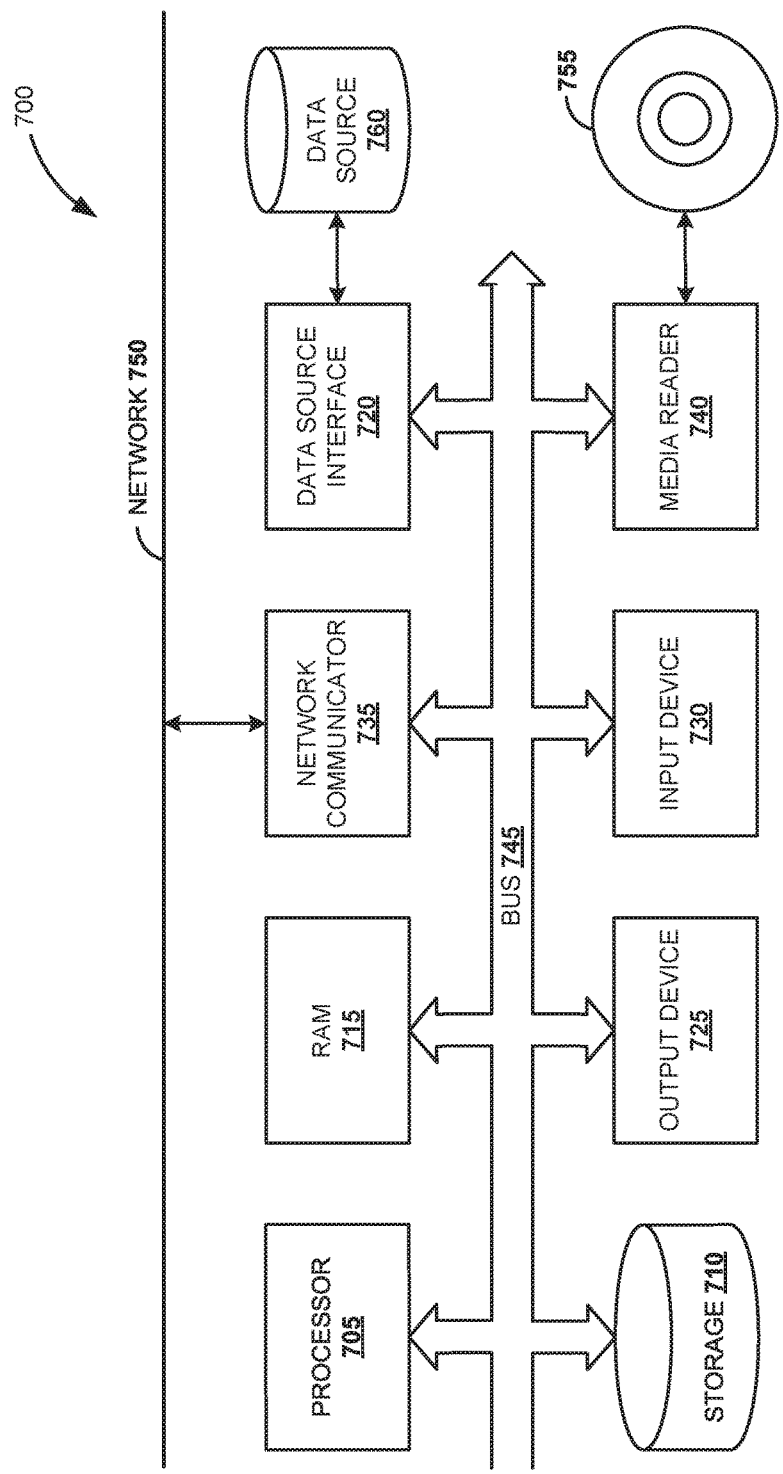
FIG. 7 is a block diagram illustrating an example computer system, according to an embodiment.

FIG. 7 is a block diagram of example computer system 700, according to an embodiment. The computer system 700 includes a processor 705 that executes software instructions or code stored on a computer readable storage medium 755 to perform the above-illustrated methods. The processor 705 can include a plurality of cores. The computer system 700 includes a media reader 740 to read the instructions from the computer readable storage medium 755 and store the instructions in storage 710 or in random access memory (RAM) 715. The storage 710 provides a large space for keeping static data where at least some instructions could be stored for later execution. According to some embodiments, such as some in-memory computing system embodiments, the RAM 715 can have sufficient storage capacity to store much of the data required for processing in the RAM 715 instead of in the storage 710. In some embodiments, the data required for processing may be stored in the RAM 715. The stored instructions may be further compiled to generate other representations of the instructions and dynamically stored in the RAM 715. The processor 705 reads instructions from the RAM 715 and performs actions as instructed. According to one embodiment, the computer system 700 further includes an output device 725 (e.g., a display) to provide at least some of the results of the execution as output including, but not limited to, visual information to users and an input device 730 to provide a user or another device with means for entering data and/or otherwise interact with the computer system 700. One or more of these output devices 725 and input devices 730 could be joined by one or more additional peripherals to further expand the capabilities of the computer system 700. A network communicator 735 may be provided to connect the computer system 700 to a network 750 and in turn to other devices connected to the network 750 including other clients, servers, data stores, and interfaces, for instance. The modules of the computer system 700 are interconnected via a bus 745. Computer system 700 includes a data source interface 720 to access data source 760. The data source 760 can be accessed via one or more abstraction layers implemented in hardware or software. For example, the data source 760 may be accessed by network 750. In some embodiments, the data source 760 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open Database Connectivity (ODBC), produced by an underlying software system, e.g., an enterprise resource planning (ERP) system, and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the one or more embodiments can be practiced without one or more of the specific details or with other methods, components, techniques, etc. In other instances, well-known operations or structures are not shown or described in details.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the embodiment are described herein for illustrative purposes, various equivalent modifications are possible within the scope of the embodiments, as those skilled in the relevant art will recognize. These modifications can be made to the embodiments in light of the above detailed description. Rather, the scope of the one or more embodiments is to be determined by the following claims, which are to be interpreted in accordance with established doctrines of claim construction.

What is claimed is:

1. A non-transitory computer readable storage medium storing instructions, which when executed by a computer cause the computer to:
   receive a plurality of alerts corresponding to a plurality of objects;
   determine whether at least two alerts in the plurality of alerts include an identical priority;
   determine the alert rankings for the at least two alerts based on a runtime attribute;
   when two or more alerts in the at least two alerts include an identical alert ranking upon determining the alert rankings based on the runtime attribute, determine the alert rankings of the two or more alerts based on another runtime attribute; and
   render the plurality of alerts including the alert rankings to provide an order in which the plurality of alerts to be addressed.

2. The non-transitory computer-readable medium of claim 1, wherein determining whether the at least two alerts in the plurality of alerts include the identical priority comprises:
   retrieve priorities associated with the plurality of alerts;
   sort the plurality of alerts based on the associated priorities; and
   determine whether the at least two alerts in the sorted plurality of alerts include the identical priority.

3. The non-transitory computer-readable medium of claim 1, wherein determining the alert rankings for the two or more alerts comprises:
   when the two or more alerts in the at least two alerts include the identical alert ranking upon determining the alert rankings based on the runtime attribute, determine an existence of another runtime attribute; and
   upon determining the existence of another runtime attribute, determine the alert rankings for the two or more alerts based on another runtime attribute.

4. The non-transitory computer-readable medium of claim 3, further comprising instructions, which when executed by the computer cause the computer to:
   when the two or more alerts does not include the identical alert ranking, render the plurality of alerts including the alert rankings to provide the order in which the plurality of alerts to be addressed.

5. The non-transitory computer-readable medium of claim 1, wherein the runtime attributes comprises runtime state and contributing metrics associated with the alerts.

6. The non-transitory computer-readable medium of claim 1, wherein the runtime attributes comprise a current rating associated with an alert, duration of the current rating, a number of times rating associated with the alert has changed, a number of metrics associated with the alert are rated red, a number of metrics associated with the alert are rated yellow, a total length of time the alert was rated red, a total length of time the alert was rated yellow, a total length of time the alert was in open state, and a category associated with the alert.

7. The non-transitory computer-readable medium of claim 1, wherein when the at least two alerts does not include the identical priority, render the plurality of alerts in an order based on priorities associated with the plurality of alerts.

8. A computer implemented method to provide alert management based on alert rankings, comprising:
- receiving a plurality of alerts corresponding to a plurality of objects;
- determining whether at least two alerts in the plurality of alerts include an identical priority;
- determining the alert rankings for the at least two alerts based on a runtime attribute;
- when two or more alerts in the at least two alerts include an identical alert ranking upon determining the alert rankings based on the runtime attribute, determining the alert rankings of the two or more alerts based on another runtime attribute; and
- rendering the plurality of alerts including the alert rankings to provide an order in which the plurality of alerts to be addressed.

9. The computer implemented method of claim 8, wherein determining whether the at least two alerts in the plurality of alerts include the identical priority comprises:
- retrieving priorities associated with the plurality of alerts;
- sorting the plurality of alerts based on the associated priorities; and
- determining whether the at least two alerts in the sorted plurality of alerts include the identical priority.

10. The computer implemented method of claim 8, wherein determining the alert rankings for the two or more alerts comprises:
- when the two or more alerts in the at least two alerts include the identical alert ranking upon determining the alert rankings based on the runtime attribute, determining an existence of another runtime attribute; and
- upon determining the existence of another runtime attribute, determining the alert rankings for the two or more alerts based on another runtime attribute.

11. The computer implemented method of claim 10, further comprising:
- when the two or more alerts does not include the identical alert ranking, rendering the plurality of alerts including the alert rankings to provide the order in which the plurality of alerts to be addressed.

12. The computer implemented method of claim 8, wherein the runtime attributes comprises runtime state and contributing metrics associated with the alerts.

13. The computer implemented method of claim 8, wherein the runtime attributes comprise a current rating associated with an alert, duration of the current rating, a number of times rating associated with the alert has changed, a number of metrics associated with the alert are rated red, a number of metrics associated with the alert are rated yellow, a total length of time the alert was rated red, a total length of time the alert was rated yellow, a total length of time the alert was in open state, and a category associated with the alert.

14. The computer implemented method of claim 8, wherein when the at least two alerts does not include the identical priority, rendering the plurality of alerts in an order based on priorities associated with the plurality of alerts.

15. A computing system to provide alert management based on alert rankings, comprising:
- at least one processor; and
- one or more memory devices communicative with the at least one processor, wherein the one or more memory devices store instructions to:
  - receive a plurality of alerts corresponding to a plurality of objects;
  - determine whether at least two alerts in the plurality of alerts include an identical priority;
  - determine the alert rankings for the at least two alerts based on a runtime attribute;
  - when two or more alerts in the at least two alerts include an identical alert ranking upon determining the alert rankings based on the runtime attribute, determine the alert rankings of the two or more alerts based on another runtime attribute; and
  - render the plurality of alerts including the alert rankings to provide an order in which the plurality of alerts to be addressed.

16. The computing system of claim 15, wherein determining whether the at least two alerts in the plurality of alerts include the identical priority comprises:
- retrieve priorities associated with the plurality of alerts;
- sort the plurality of alerts based on the associated priorities; and
- determine whether the at least two alerts in the sorted plurality of alerts include the identical priority.

17. The computing system of claim 15, wherein determining the alert rankings for the two or more alerts comprises:
- when the two or more alerts in the at least two alerts include the identical alert ranking upon determining the alert rankings based on the runtime attribute, determine an existence of another runtime attribute; and
- upon determining the existence of another runtime attribute, determine the alert rankings for the two or more alerts based on another runtime attribute.

18. The computing system of claim 17, further comprising:
- when the two or more alerts does not include the identical alert ranking, render the plurality of alerts including the alert rankings to provide the order in which the plurality of alerts to be addressed.

19. The computing system of claim 15, wherein the runtime attributes comprise a current rating associated with an alert, duration of the current rating, a number of times rating associated with the alert has changed, a number of metrics associated with the alert are rated red, a number of metrics associated with the alert are rated yellow, a total length of time the alert was rated red, a total length of time the alert was rated yellow, a total length of time the alert was in open state, and a category associated with the alert.

20. The computing system of claim 15, wherein when the at least two alerts does not include the identical priority, render the plurality of alerts in an order based on priorities associated with the plurality of alerts.

* * * * *